UNITED STATES PATENT OFFICE.

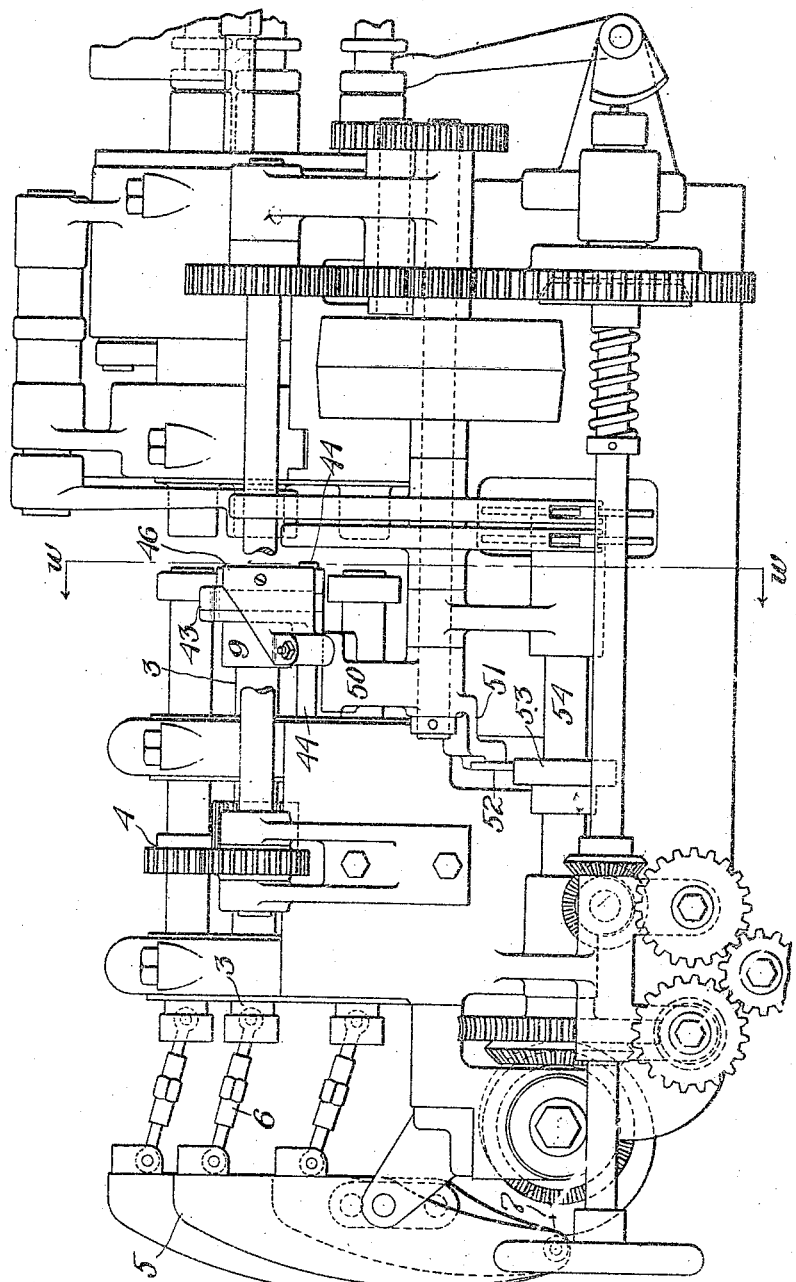

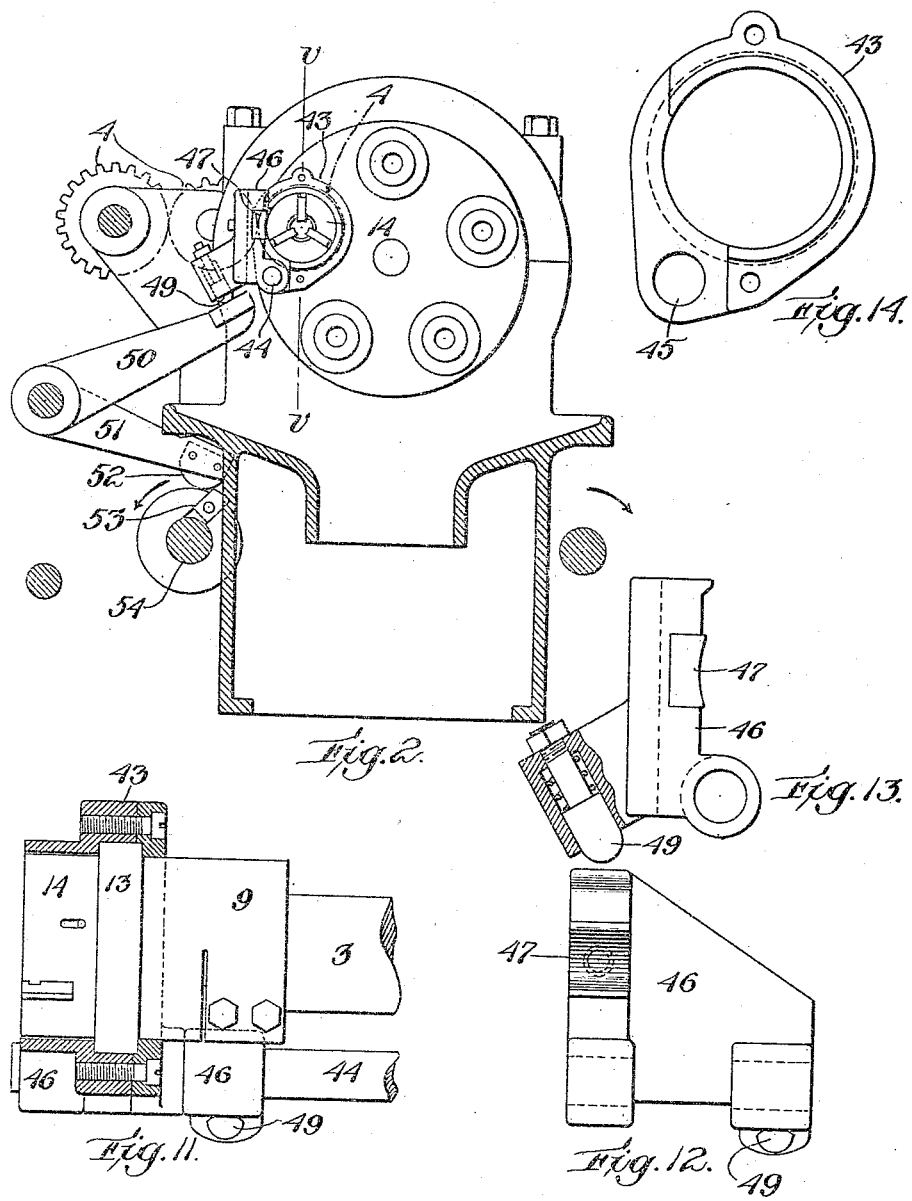

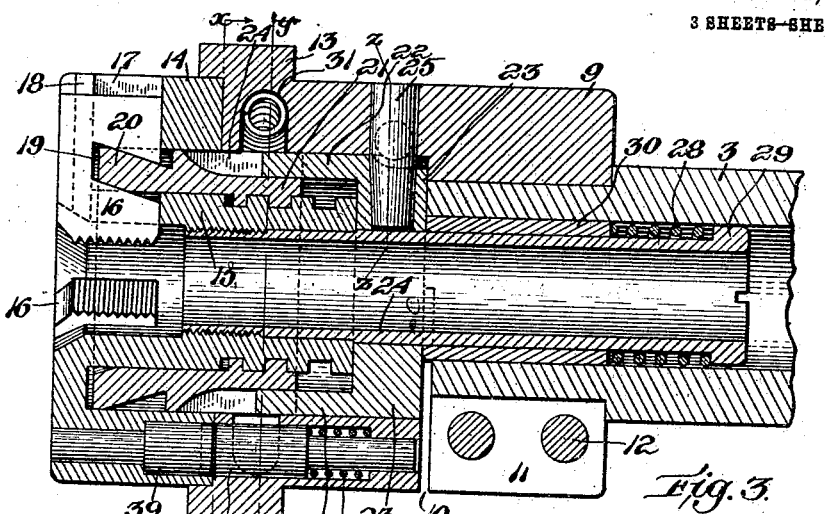

WILLIAM S. DAVENPORT, OF NEW BEDFORD, MASSACHUSETTS.

SCREW-CUTTING MACHINE.

1,055,448.

Specification of Letters Patent. Patented Mar. 11, 1913.

Application filed February 14, 1910. Serial No. 543,661.

*To all whom it may concern:*

Be it known that I, WILLIAM S. DAVENPORT, a citizen of the United States, residing at New Bedford, in the county of Bristol and State of Massachusetts, have invented certain new and useful Improvements in Screw-Cutting Machines; and I do hereby declare the following to be a full, clear, and exact description of the invention, such as will enable others skilled in the art to which it appertains to make and use the same.

The invention relates to screw cutting machines, and more particularly to the thread cutting mechanism or device of such machine.

The object of the invention is to provide a novel and improved thread cutting mechanism adapted for use in automatic screw machines, and also to provide a novel and improved construction of die carrying head which is adapted for use in either hand operated or automatic screw cutting machines.

To this end the invention consists in the features of construction and combinations hereinafter described and set forth in the claims.

In the drawings Figure 1 is a side elevation of an automatic screw machine embodying one form of my invention; Fig. 2 is a section on line $w$—$w$, Fig. 1; Fig. 3 is a central longitudinal sectional view of the die end of the tool spindle; Fig. 4 is an elevation of the left-hand end of the parts shown in Fig. 3; Fig. 5 is a section on line $x$—$x$, Fig. 3; Fig. 6 is a section on line $y$—$y$, Fig. 3; Fig. 7 is a diagrammatic sectional view illustrating the structure of the die end of the tool spindle; Fig. 8 is a section on line $z$—$z$, Fig. 3; Figs. 9 and 10 are details of the chaser nut hereinafter described; Fig. 11 is a partial section on the line $v$—$v$, Fig. 2; Figs. 12 and 13 are details of the brake lever for the die head hereinafter described; and Fig. 14 is an elevation of the guard hereinafter described.

In the drawings the various features of the invention are shown embodied in an automatic screw machine which is substantially the same in general construction and mode of operation as the machine shown and described in my application No. 291,872, filed December 15, 1905. In this machine the rods of stock to be operated upon are carried in a series of rotary work spindles mounted in a head which is indexed to bring the spindles successively into position to be operated upon by the various tools. The dies or chasers for cutting threads upon the work are mounted upon the front end of a tool spindle 3 which is continuously driven in the same direction as the work spindle, but at a different speed, and is automatically reciprocated to feed the thread cutting chasers on to the work and to retract the chasers after the thread has been cut.

In the construction shown the spindle 3 is continuously rotated through gears 4, one of which is secured to the spindle and is long enough to maintain engagement with the driving gear during the reciprocation of the spindle. The spindle is reciprocated through a lever 5 connected with the rear end of the spindle through a link 6 and operated by a cam 7 secured to one of the cam shafts of the machine, the end of the lever being held in continuous engagement with the cam by a spring arranged within the spindle, in the manner clearly shown in the application above referred to.

The construction of the die head within which the thread cutting dies or chasers are carried is clearly shown in Figs. 3 to 10. As here shown, the thread cutting dies or chasers, and the devices for moving them radially to open and close the die, are carried in a cylindrical head 9 adapted to be secured to the front end of the spindle 3. The rear end of the body 9 is provided with a cylindrical socket for the reception of the front end of the spindle 3, and is slotted transversely at 10 and longitudinally at 11 so that it may be securely clamped on the end of the spindle by the clamping bolts 12. The body is provided with a flange 13 at its front end for a purpose to be hereinafter described, and its front face is recessed to receive the cylindrical head 14 of a chaser holder 15. The chasers 16 which form the thread cutting die are mounted to slide radially in guideways 17 formed in the front end of the head 14, and are held in the guideways by ribs 18 which fit within corresponding grooves in the sides of the chasers. The chasers are provided with inclined slots 19 which fit over the tapered or conical front end 20 of a chaser nut 21. The chaser nut 21 surrounds the chaser holder 15 and is provided with a coarse left-hand thread which engages a similar thread formed on the chaser holder. With this construction, a relative rotation between the chaser holder and the chaser nut will cause a relative longitudinal movement between the chasers and chaser nut, so that the chasers will be moved radially inward or outward, as the case may be, by the tapered or conical end of the nut acting within the inclined grooves on the chasers.

In the construction shown, the chaser nut is held from rotation and the chaser holder is rotated to cause a longitudinal movement of the nut in effecting the opening or closing of the chasers. The chaser nut is held from rotation by a series of fingers 22 which project longitudinally up from a collar 23 and engage longitudinal grooves 24' formed in the periphery of the nut. The collar 23 is mounted within the body 9 and surrounds a sleeve 24 which is secured within the chaser holder 15 and projects rearwardly therefrom. The collar is held from rotation by means of a radially projecting pin 25 which extends outward into a slot 26 formed in the body 9, and is engaged and held in adjusted position by means of adjusting screws 27. The chaser holder is held within the socket or bearing in the front end of the body 9 by means of a spring 28 surrounding the sleeve 24, and interposed between a head 29 formed on the rear end of the sleeve and a collar or sleeve 30, the front end of which bears against the collar 23. The rotation of the work while engaged by the chasers tends to rotate the chaser holder in a direction to move the chaser nut 21 toward the right in Fig. 3 and thus open the chasers. A spring 31 is arranged within an annular recess in the body 9, and also tends to rotate the chaser holder in a direction to cause the opening of the chasers. One end of this spring engages a block 32, which is connected by means of a pin 33 with the head of the chaser holder, and the other end of the spring bears against a screw 34 which is mounted in the head 9. When the chaser holder is rotated into position to move the chasers radially inward into closed position, it is held in this position against the tension of the spring 31, and against the action of the work, by a latching pin 35 mounted within the body 9 and pressed forward into latching position by a spring 36. The forward movement of the latching pin is determined by the head of the screw 34 which engages a shoulder on the side of the latching pin, as indicated in Fig. 7. The front end of the latching pin is provided with a latching projection 37 arranged to engage a shoulder 38 formed in a wear-pin 39 which is secured in the head of the chaser holder. The front wall of the annular groove within which the spring 31 is arranged is cut away to form a slot 40 in which the pin 33 plays as the chaser holder is rotated to open or close the chasers. A spring-pressed stop pin 41 is mounted in the head 14 of the chaser holder, and the end of the pin projects into the slot 40 and coöperates with the end 42 of the slot in arresting the rotation of the chaser holder when the holder is rotated by the rotation of the work and spring 31 to open the chasers.

The operation is as follows: After the thread has been cut the desired distance on the work, the forward movement of the body 9 ceases, and the chaser holder continues to advance, owing to the engagement of the chasers with the work. The spring 28 yields to allow this advance movement of the chaser head relative to the body, and this movement of the chaser head carries the shoulder 38 out of engagement with the projection 37 on the latch pin 36, so that the rotation of the work and the spring 31 causes the chaser holder to rotate until the stop pin 41 brings up against the end 42 of the slot 40. This rotation of the chaser holder moves the chaser nut 21 toward the right in Fig. 3, thus quickly opening the chasers so that they are out of engagement with the work and may be retracted without danger of injury thereto. After the chasers have been opened, the spring 28 draws the chaser holder back until the head of the chaser holder engages the bottom of the recess in the front end of the body, the latch pin 35 being forced back against the tension of the spring 36. After the chasers have been thus opened the body 9 is retracted to withdraw the chasers from the work and bring them into position to operate upon the next succeeding piece of work. After the chasers have been withdrawn to a position beyond the end of the work and before they are again advanced into position to act upon the work, the chaser holder is rotated against the tension of the spring 31 to advance the chaser nut and thus move the chasers radially inward into closed position. This rotation of the chaser holder brings the shoulder 38 into position to be engaged by the latching projection 37 on the pin 35 and the pin snaps forward into position to lock the chaser and retain the chasers in closed position during the next advance movement of the body 9. In case it is desired to vary the closed position of the chasers to adjust the die for cutting the thread to an exact size, or to vary the size of the die for different diameters of work, the position of the chaser nut 21 may be adjusted by manipulation of the adjusting screw 27. If it is desired to change the chasers this may be readily accomplished by withdrawing the stop pin 41 against the tension of its spring so that the chaser holder may rotate under the influence of the spring 31 until the pin 33 brings up against the end 42 of the slot 40. This rotation of the chaser holder will move the chaser nut 21 sufficiently to withdraw the tapered or conical end 20 from the slots 19 of the chasers so that the chasers may be removed from their guiding slots.

In the construction shown in the drawings the rotation of the chaser holder in a direction to close the chasers is automatically effected during the automatic reciprocation of the spindle 3 to which the head 9 is secured. The mechanism shown for thus automatically actuating the chaser holder to close the chasers comprises a guard 43 which partially surrounds the head 14 of the chaser holder and embraces the flange 13 on the body 9 so that it will move back and forth with the body as the spindle 3 is reciprocated. The body 9 and head 14 are free to rotate within the guard 43 and the guard is held from rotation by a stud 44 which extends through holes 45 formed in the two sections of the casing. A lever 46 is pivotally mounted upon the stud 44 by means of lugs which engage opposite sides of the guard 43 so that the lever moves backward and forward with the guard. The upper end of the lever carries a shoe 47 which is moved into and out of the path of the head of a screw 48 which projects slightly from the periphery of the head 14. The lower end of the lever 46 carries a spring-pressed pin 49 which is engaged by one arm 50 of a lever, the other end 51 of which carries a plate 52. The plate 52 is arranged so that it is engaged at proper intervals by a cam 53 secured to one of the side cam shafts 54 of the machine.

The shoe of the lever 46 is normally out of the path of the screw head 48 on the chaser holder 14 so that it does not interfere with the rotation of the head as the die head is advanced during the cutting operation or with the rotation of the chaser holder in affecting the opening of the chasers. After the die has been retracted the cam 53 engages the plate 52 on the lever 51 and swings the upper end of the lever 46 forward so that the screw 48 engages the shoe 47 on the lever. This arrests the rotation of the chaser holder so that the holder is rotated relatively to the head 9 in a direction to cause a closing of the chasers and to bring the chaser holder into position to be engaged and locked by the latching pin 35. The cam 53 then passes beyond the plate 52 so that the upper end of the lever 46 is retracted and remains in normal retracted position until the chasers are to be again automatically closed.

With the construction and arrangement described, the chasers forming the thread cutting die are automatically opened at the end of the advance or thread cutting stroke of the die head, and are automatically closed after the head has been retracted, preparatory to operating upon the succeeding piece of work. The construction of the die head shown and described is also well adapted for use in screw cutting machines in which the turret or other tool holder in which the tools are mounted is either wholly or partially operated by hand. In using the die head in such machines, the body 9 of the head is secured upon a shank or arbor corresponding to the spindle 3, and the shank or arbor is secured in the turret or other tool holding support. In this case the guard 43 and the mechanism connected therewith is not employed, and the chaser holder is manually rotated against the tension of the spring 31 in effecting the closing of the chasers. In order that the chaser holder may be readily manipulated in closing the chasers, the screw 48 may be removed and the radially projecting pin 55 substituted therefor. The operation of the parts in automatically opening the chasers at the end of the advance or cutting stroke of the die head is the same when the head is used in a hand machine as when the head is used in an automatic machine. The closing of the chasers is effected, in using the head in a hand machine, by the operator, after the die head has been retracted, preparatory to operating upon the succeeding piece of work.

Having explained the nature and object of the invention, and specifically described one form in which it may be embodied, what I claim is:—

1. A screw cutting machine, having, in combination, a die head, a chaser holder mounted for relative rotation in the head, means for opening the chasers upon a rotation of the chaser holder with the work, means for restraining and releasing the chaser holder, and mechanism for automatically holding the chaser holder against rotation to close the chasers, substantially as described.

2. A screw cutting machine, having, in combination, a rotary work spindle, a die head, chasers carried thereby, mechanism for rotating the head in the same direction as the work spindle and at a different speed, mechanism for reciprocating the die head, mechanism for automatically opening the chasers at the end of the advance stroke of the head, and mechanism for automatically closing the chasers, substantially as described.

3. A die head for screw cutting machines, having, in combination, a body, a chaser holder mounted for relative rotation in the body, chasers mounted therein, a chaser nut provided with an annular taper engaging the chasers to move them radially, and means for relatively rotating the chaser holder and chaser nut to open and close the chasers, substantially as described.

4. A die head for screw cutting machines, having, in combination, a body, a chaser holder, chasers mounted therein, a chaser nut provided with a conical flange engaging the chasers and means for relatively rotating the nut and chaser holder to open and close the chasers, substantially as described.

5. A die head for screw cutting machines, having, in combination, a body, a chaser holder, chasers mounted therein, a chaser nut provided with an annular taper engaging the chasers to move them radially, and means for relatively rotating the chaser holder and chaser nut to open and close the chasers, substantially as described.

6. A die head for screw cutting machines, having, in combination, a body, a chaser holder yieldingly held against longitudinal movement in the body, latching devices for preventing rotation of the chaser holder with the work, chasers mounted in the chaser holder, and means operated by rotation of the chaser holder with the work for opening the chasers, substantially as described.

7. A die head for screw cutting machines, having, in combination, a body, a chaser holder mounted for relative rotation and longitudinal movement in the body, a spring for holding the chaser holder against longitudinal movement in the body, chasers mounted in the chaser holder, devices operated by relative rotation of the chaser holder in the body for opening and closing the chasers, latching devices for preventing relative rotation of the chaser holder and body when the chasers are in engagement with the work arranged to be disengaged by longitudinal movement of the chaser holder, and a spring operating to rotate the chaser holder in a direction to open the chasers, substantially as described.

8. A die head for screw cutting machines, having, in combination, a body, a chaser holder mounted for relative rotation in the body and for longitudinal movement therein, a spring for holding the chaser holder against longitudinal movement, a chaser nut engaging a thread on the chaser holder, chasers mounted in the chaser holder, a taper on the chaser nut engaging the chasers to move them radially, latching devices for holding the chaser holder against rotation arranged to be disengaged by longitudinal movement of the chaser head, and a spring for rotating the chaser holder in a direction to open the chasers, substantially as described.

9. A die head for screw cutting machines, having, in combination, a body, a chaser holder mounted in the body, a chaser nut engaging a thread on the chaser holder, chasers mounted in the chaser holder and connected with the chaser nut, means for relatively rotating the chaser holder and nut to open and close the chasers, and means for adjusting the relative position of the chaser head and nut when the chasers are in closed position to adjust the chasers for different sizes of work, substantially as described.

WILLIAM S. DAVENPORT.

Witnesses:
   EDWARD T. BANNON,
   MARY L. SAWYER.